United States Patent
Wang

(10) Patent No.: US 11,882,132 B2
(45) Date of Patent: Jan. 23, 2024

(54) CONTENT-BASED APPLICATION SECURITY FOR DISTRIBUTED COMPUTING SYSTEM

(71) Applicant: Prescient Devices, Inc., Groton, MA (US)

(72) Inventor: Andrew Wang, Groton, MA (US)

(73) Assignee: Prescient Devices, Inc., Groton, MA (US)

(*) Notice: Subject to any disclaimer, the term of this patent is extended or adjusted under 35 U.S.C. 154(b) by 306 days.

(21) Appl. No.: 17/221,570

(22) Filed: Apr. 2, 2021

(65) Prior Publication Data

US 2021/0314334 A1  Oct. 7, 2021

Related U.S. Application Data

(60) Provisional application No. 63/005,133, filed on Apr. 3, 2020.

(51) Int. Cl.
*H04L 9/40* (2022.01)

(52) U.S. Cl.
CPC ...... *H04L 63/1416* (2013.01); *H04L 63/0876* (2013.01); *H04L 63/102* (2013.01); *H04L 63/1441* (2013.01); *H04L 63/20* (2013.01)

(58) Field of Classification Search
CPC ............. H04L 63/1416; H04L 63/0876; H04L 63/102; H04L 63/1441; H04L 63/20
See application file for complete search history.

(56) References Cited

U.S. PATENT DOCUMENTS

| | | | | |
|---|---|---|---|---|
| 5,440,723 | A * | 8/1995 | Arnold | G06F 21/566 714/33 |
| 7,761,923 | B2 * | 7/2010 | Khuti | H04L 63/0209 726/11 |
| 7,953,980 | B2 * | 5/2011 | Schluessler | G06F 21/54 713/180 |
| 8,285,999 | B1 | 10/2012 | Ghose et al. | |
| 9,838,398 | B2 * | 12/2017 | Barton | G06F 21/44 |
| 10,523,699 | B1 * | 12/2019 | Alamuri | H04L 63/08 |
| 10,671,724 | B2 * | 6/2020 | Boutnaru | G06F 21/566 |
| 2003/0191940 | A1 | 10/2003 | Sinha et al. | |
| 2017/0163666 | A1 * | 6/2017 | Venkatramani | H04L 63/0272 |
| 2017/0171226 | A1 * | 6/2017 | Watkins | H04L 43/04 |
| 2018/0233152 | A1 * | 8/2018 | Olaya | G10L 15/22 |
| 2019/0236269 | A1 * | 8/2019 | Hay | G06F 21/577 |

OTHER PUBLICATIONS

International Searching Authority—International Search Report—International Application No. PCT/US2021/025617, dated May 27, 2021, together with the Written Opinion of the International Searching Authority, 13 pages.

* cited by examiner

*Primary Examiner* — Matthew Smithers
*Assistant Examiner* — Shu Chun Gao
(74) *Attorney, Agent, or Firm* — Sunstein LLP

(57) ABSTRACT

A computer-implemented method of monitoring security of a set of computing devices in a distributed system, the distributed system having a plurality of computing devices, in communication with one another over a network, by a security software running in a computer node. The method includes comparing an app signature of the application running in a selected one of the set of computing devices to a reference app signatures generated from a respective functional replica of the application.

16 Claims, 5 Drawing Sheets

CONTENT-BASED APPLICATION SECURITY FOR DISTRIBUTED COMPUTING SYSTEM

CROSS-REFERENCE TO RELATED APPLICATIONS

The present application claims the benefit of my U.S. Provisional Patent Application Ser. No. 63/005,133, entitled "Content-Based Application Security for Distributed Computing System" and filed Apr. 3, 2020, which is hereby incorporated herein by reference in its entirety.

TECHNICAL FIELD

The present invention relates to methods of designing computer program security monitoring for a distributed computing system.

BACKGROUND ART

A computing device is a device that is capable of performing computing tasks based on computer programs. Most of today's organizations own a large number of computing devices running many computer programs. These computing devices are often networked with each other and with the outside world. When two or more computing devices are networked with each other and/or with the outside world, it is called a distributed computing system, or simply, a distributed system.

If a networked computing device does not implement proper security monitoring, a hacker could gain access into the device and alter its computer programs. Thus, computer program security is vital to all organizations. However, in a distributed system, the computing devices are running different computer programs, and it is very difficult to track all these computer programs for security monitoring. Typical methods such as monitoring log files, network activity behavior, etc., have limited effectiveness.

SUMMARY OF THE EMBODIMENTS

In accordance with one embodiment of the invention, a computer-implemented method of monitoring security of a set of computing devices in a distributed system is provided. The distributed system has a plurality of computing devices, each computing device executing an application associated with the device, the computing devices being in communication with one another over a network, the security being monitored by a security program causing execution of security computer processes in a computer node. The security computer processes include receiving, by the computer node, from a selected device in the set of computing devices, an app signature for the selected device's associated application. The security computer processes further include generating, by the computer node a reference app signature for a reference application, in an application repository, corresponding to the selected device's associated application. The security computer processes also include comparing, by the computer node, the reference app signature to the app signature of the associated application of the selected device. The security computer processes also include determining, by the computer node, a potential security breach if the reference app signature fails to match the app signature of the associated application of the selected device. If the reference app signature does fail to match the app signature of the associated application of the select device, the security computer processes include causing the computer node to enter an alarm state.

Alternatively or in addition, the reference application is another instance of the device's associated application, and has been generated by the computer node from a functional replica of the associated application stored in the application repository. Also alternatively or in addition, wherein the reference application has been generated by the computer node from the functional replica through a set of computer processes F( ).

Further alternatively or in addition, the app signature has been generated by the device by applying a set of computer processes G( ) to the device's associated application. Alternatively or in addition, the reference app signature is generated by the computer node by applying computer processes F( ) and then computer processes G( ), in the form G(F( )), to the functional replica.

In a related embodiment, the security program causes execution of the security computer processes repetitively. Alternatively or in addition, the app signature has been generated by the device from a portion of the device's associated application, and the reference app signature is generated by the computer node from a portion of the functional replica corresponding to the portion of the device's associated application.

Also alternatively or in addition, receiving the app signature for the selected device's associated application is responsive to a request to the selected device. Further alternatively or in addition, the selected device automatically generates and transmits the app signature of its associated application. Alternatively or in addition, the application repository is an item selected from the group consisting of a database, a git repository, a file, and another data structure in computer storage.

In a related embodiment of the present invention, the security program is integrated with a design software system for distributed systems running in the computer node.

Alternatively or in addition, the reference application is another instance of the device's associated application, and has been generated by the computer node from a stored functional replica of the application through a set of computer processes F( ).

Also alternatively or in addition, the application repository has been generated by the design software system. Further alternatively or in addition, user login is disabled for the selected computing device, and changes to the device's associated application can be made only inside the design software system.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
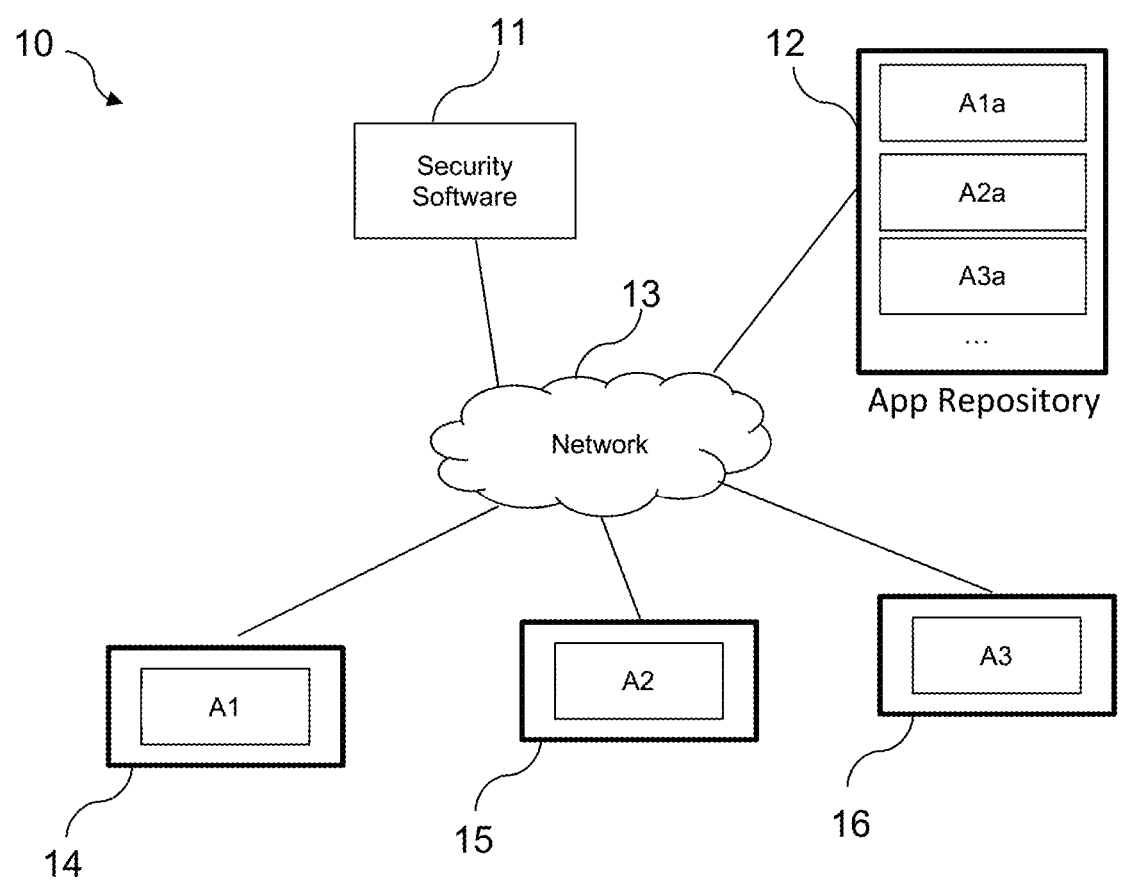
FIG. 1 is an architectural block diagram of an embodiment of the current invention providing a security-enabled distributed system.

Definitions. As used in this description and the accompanying claims, the following terms shall have the meanings indicated, unless the context otherwise requires:

A "set" includes at least one member.

A "computer node" is a computing device in a computing network.

A system is "distributed" if it includes a plurality of computing devices, which may, but need not be, in physically distinct locations, in communication with one another over network.

A computing device executes an application "associated" with the device if the application has been assigned to the device for execution, regardless whether another copy of the application may be running on another device.

An "app signature" from a selected device running an application associated with the selected device is an output from the selected device obtained by applying to the associated application a defined function.

A "functional replica" of a computer program is a digital representation of the program from which the program can be generated. Illustratively, a function notation is used in this description to show the relationship between a functional replica of a program and the program itself. Further details of these relationships are provided below.

A "network" is a medium by which computer nodes in a distributed environment can communicate with one another. The medium can be the internet, or a different environment utilizing more specialized protocols such as industrial ethernet, or a combination of multiple network protocols. The medium can be wired, wireless, or a combination of wired and wireless.

A "reference application," corresponding to an application associated with a selected device, is a code object, stored in an application repository, from which can be constructed the associated application.

A "reference app signature" is an app signature developed from a reference application by first using the corresponding code object to construct the associated application and then applying the defined function to the constructed associated application.

A "design software" is a software program that enables a user to design and manage applications for a system. In the present invention, "design software" refers to the software program embodiment to design applications for a distributed system.

A "user" is a person who uses design software to design or manage applications for a system.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

FIG. 1 is an architectural block diagram of an embodiment of the current invention providing a security-enabled distributed system. Exemplary system 10 includes a computer node 11 executing a security software application, an app repository 12, a network 13, and computing devices 14, 15, 16. Computing devices 14, 15, 16 store and execute applications A1, A2, and A3, respectively.

Computer programs may be embodied in various forms, including, but in no way limited to, a source code form, a computer executable form, and various intermediate forms (e.g., forms generated by an assembler, compiler, networker, or locator.)

App repository 12 is a computer program storage space. Exemplary embodiments of app repository 12 include a database, a Git repository, and a file.

App repository 12 stores a plurality of computer program representations, including A1$a$, A2$a$, and A3$a$.

A1$a$ is a functional replica of A1. Application A1 is generated as a function of functional replica A1$a$. A1$a$ may be different from A1, but A1 can be generated from A1$a$ using the function F( ):

$$A1 = F(A1a)$$

Function F( ) is a set of computer processes that works on its input (i.e. A1$a$) and produces its output (i.e. A1).

An exemplary F( ) is the following set of computer processes: add a pre-defined header file to A1$a$, add a pre-defined functional block to A1$a$, and add a unique ID to A1$a$.

Similarly, A2$a$ is a functional replica of A2, and A3$a$ is a functional replica of A3.

The security software executing in computer node 11 is a computer program that performs security monitoring on system 10. It is connected to computing devices 14, 15, 16 through network 13. It is also connected to app repository 12 through network 13.

In another embodiment of the present invention, App repository 12 resides in the same computer node 11 that the security software resides in, and the security software executing in computer node 11 can directly access app repository 12.

Figure 2:
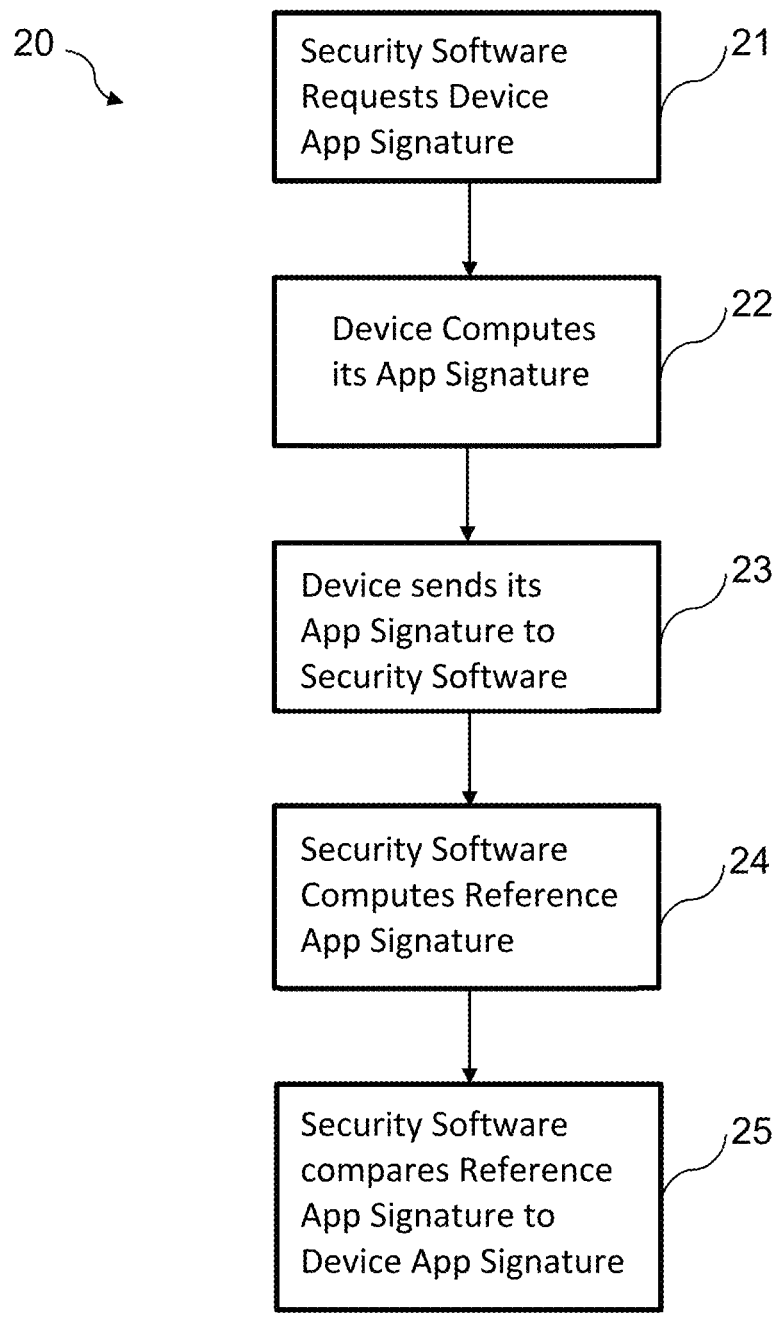
FIG. 2 is a flowchart of a method of monitoring security in accordance with an embodiment of the present invention.

FIG. 2 is a logic flow diagram showing an embodiment of the present invention. In step 21, the security software sends a command to a selected computing device to request the computing device's app signature.

An app signature is a code that is generated from a stored application through applying a function Go. For example:

$$S1 = G(A1)$$

S1 is the app signature of computer program A1. Function G( ) is a set of computer processes that accepts an input (i.e. A1) and produces an output (i.e. S1). An exemplary G( ) is a set of computer processes executing a hash function.

In step 22, the selected computing device generates an app signature of an application associated with the computing device using the set of computer processes Go.

In step 23, the computing device sends the app signature of the application associated with the computing device to the security software.

In step 24, the security software computes the reference app signature corresponding to the selected computing device's associated application. The reference app signature is computed using the set of computer processes G(F(x)), where x is a stored functional replica of an application. For example, the reference app signature for application A1 in computing device 14 in FIG. 1 can be generated as follows:

$$S1a = G(F(A1a))$$

S1*a* is the reference app signature, G( ) is the set of computer processes used in Step 21, F( ) is the set of computer processes used to convert A1*a* to A1.

In step 25, the security software compares the reference app signature to the app signature. If the two signatures are not the same, then the security software determines that the application on the selected device may have been tampered with. In this case, the security software may further enter an alarm state and send an alert to a user.

In exemplary system 10, app repository 12 typically has very good security, but computing devices 14, 15, 16 may be more easily tampered with. As an example, computing device 14 gets tampered with, and a hacker changes its associated application A1. Then, the security software will determine that S1*a* is not equal to S1, which indicates that application A1 has been tampered with.

In another embodiment of the present invention, the security software executes the security computer processes described herein repetitively.

In another embodiment of the present invention, the app signature is generated from a portion of the application associated with the selected computing device, and the reference app signature is generated from a portion of the functional replica corresponding to the portion of the application. This is useful when only a certain portion of the application is critical to security monitoring.

Figure 5:
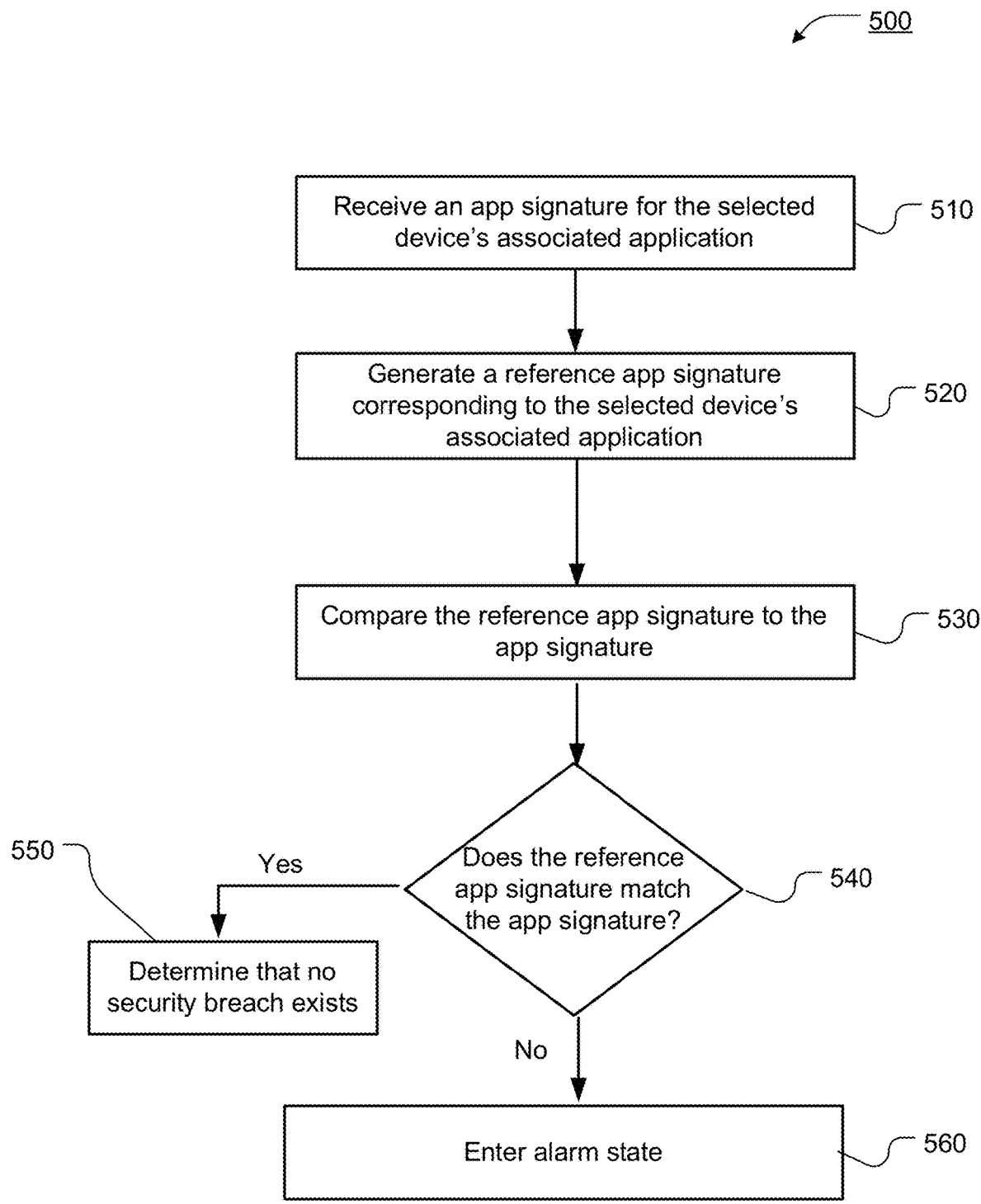
FIG. 5 is a flow diagram of a method of monitoring security in accordance with an embodiment of the present invention.

FIG. 5 is a flow diagram of a method 500 of monitoring security in accordance with an embodiment of the present invention. In step 510, a computer node executing a security program receives an app signature for a selected device's associated application. The selected device is a selected one of a set of computing devices in a distributed system. The distributed system may include more computing devices than the set of computing devices, for example, if the additional devices are not being monitored by the security program. Each computing device of the set of computing devices executes an application, which is the application associated with the device. Further, the computing devices are in communication with one another and with the computer node over a network. The computer node may receive the app signature in response to a request to the selected device. Alternatively, the selected device may automatically generate and transmit the app signature of its associated application.

In step 520, the computer node executing the security program generates a reference app signature for a reference application corresponding to the selected device's associated application. The reference application is another instance of the selected device's associated application and, illustratively, has been generated by the computer node from a functional replica of the associated application stored in an application repository. However, it is expressly contemplated that the reference application is instead stored in a database, file, repository (such as a Git repository), or similar computer storage.

In step 530, the computer node executing the security program compares the generated reference app signature to the app signature of the application associated with the selected device.

In step 540, the computer node executing the security program determines whether the reference app signature matches the app signature of the application associated with the selected device. If the reference app signature matches the app signature, then, in step 550, the computer node determines that no security breach exists.

In step 560, if the reference app signature fails to match the app signature of the application associated with the selected device, the computer node enters an alarm state. Illustratively, in the alarm state, the computer node may generate an alert. Such alert may be a visual alert, an audible alert, a communication to a user, or another kind of alert.

Figure 3:
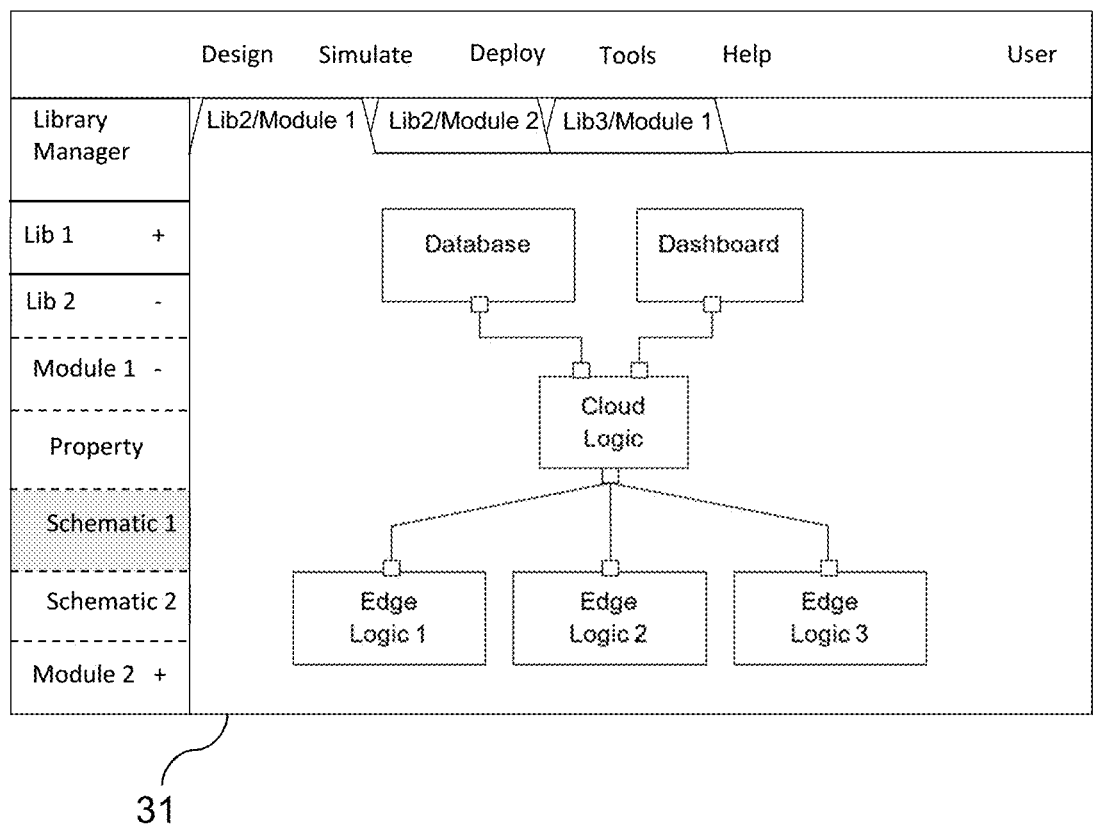
FIG. 3 is a representation of a distributed system design software in accordance with an embodiment of the present invention.

FIG. 3 shows an embodiment of a design software 31 for distributed systems. Design software 31 implements all the computing tasks of an entire distributed system. In design software 31, each of the blocks "Edge Logic 1", "Edge Logic 2", and "Edge Logic 3" represent computer programs running in 3 remote computing devices, respectively. Thus, a user can design the computer programs of all the computing devices of a distributed system in design software 31. Design software 31 is responsible for parsing and distributing the computer programs to their respective computing devices. The system of FIG. 3 is further described in U.S. Patent Application Publication No. 2020/0313961 entitled "Method and system for designing distributed dashboards" ("my design software patent application"), which is hereby incorporated by reference in its entirety.

Figure 4:
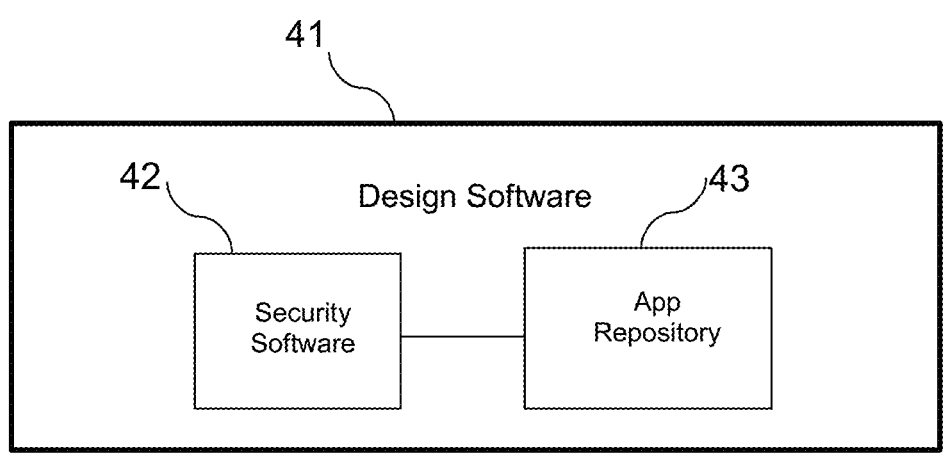
FIG. 4 is a design software system including security software and an application repository in accordance with an embodiment of the present invention.

As explained in my design software patent application, a design software system enables a user to design and manage applications for a distributed system. In embodiments of the present invention, a design software system is integrated with a security-enabled distributed system. FIG. 4 shows an embodiment of the current invention, in which this integration is achieved by providing the design software system 41 to include the security software 42 and the application repository 43. Security software 42 operates in a manner similar to security software 11 of FIGS. 1, 2, and 5, with the difference that it is integrated with functionalities of a design software system according to my design software patent application.

Design software system 41 produces applications and functional replicas of the applications for all the computing devices in the distributed system. Therefore, security software 42 can also generate the reference app signatures using the generated reference applications.

Design software system 41 employs a communication protocol to communicate with the computing devices. Security software 42 uses the same communication protocol to request and receive app signatures from the computing devices.

To further improve the security of the computing devices, an exemplary embodiment of the present invention is a distributed system in which user login is disabled for the computing devices, and users are only allowed to design and update the applications of the computing devices from design software system 41. Design software system 41 then parses and distributes the updated applications to their respective computing devices. Disabling the user login on the computing devices improves the security of the distributed system because the computing devices are more likely to be tampered with than the design software system 41, such as in an Internet of Things (IoT) system.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of monitoring security of a set of computing devices in a distributed system, the distributed system having a plurality of computing devices, each computing device executing an application associated with said device, the computing devices being in communication with one another over a network, the security being monitored by a security program causing execution of security computer processes in a computer node, the security computer processes comprising:
   generating, by a selected device in the set of computing devices, by applying a set of computer processes G( ) to the selected device's associated application, an app signature for the selected device's associated application;
   receiving, by the computer node, from the selected device, the app signature for the selected device's associated application;
   generating, by the computer node a reference app signature for a reference application, in an application repository, corresponding to the selected device's associated application, wherein the reference application is another instance of the selected device's associated application, and has been generated by the computer node from a functional replica of the associated application stored in the application repository through a set of computer processes F( );
   comparing, by the computer node, the reference app signature to the app signature of the associated application of the selected device;
   determining, by the computer node, a potential security breach if the reference app signature fails to match the app signature of the associated application of the selected device; and
   if the reference app signature does fail to match the app signature of the associated application of the selected device, then causing the computer node to enter an alarm state.

2. A method according to claim 1, wherein the reference app signature is generated by the computer node by applying the set of computer processes F( ) and then computer processes G( ), in the form G(F( )), to the functional replica.

3. A method according to claim 1, wherein the security program causes execution of the security computer processes repetitively.

4. A method according to claim 1, wherein the reference app signature is generated by the computer node from a portion of the functional replica corresponding to the portion of the device's associated application.

5. A method according to claim 1, wherein receiving the app signature for the selected device's associated application is responsive to a request to the selected device.

6. A method according to claim 1, wherein the selected device automatically generates and transmits the app signature of its associated application.

7. A method according to claim 1, wherein the application repository is an item selected from the group consisting of: a database, a Git repository, a file, and another data structure in computer storage.

8. A method according to claim 1, wherein the security program is integrated with a design software system for distributed systems running in the computer node.

9. A method according to claim 8, wherein the reference application is another instance of the selected device's associated application, and has been generated by the computer node from a stored functional replica of the application through a set of computer processes F( ).

10. A method according to claim 9, wherein the reference app signature is generated by the computer node by applying computer processes F( ) and then computer processes G( ), in the form G(F( )), to the functional replica.

11. A method according to claim 8, wherein the computer node, in the security program as part of the design software system, causes execution of the security computer processes repetitively.

12. A method according to claim 8, wherein the reference app signature is generated by the computer node from a portion of the functional replica corresponding to the portion of the device's associated application.

13. A method according to claim 8, wherein receiving the app signature for the selected device's associated application is responsive to a request to the selected device.

14. A method according to claim 8, wherein the selected device automatically generates and transmits the app signature of its associated application.

15. A method according to claim 8, wherein the application repository has been generated by the design software system.

16. A method according to claim 8, wherein user login is disabled for the selected computing device, and wherein changes to the device's associated application can be made only inside the design software system.

* * * * *